US006901379B1

(12) United States Patent
Balter et al.

(10) Patent No.: US 6,901,379 B1
(45) Date of Patent: May 31, 2005

(54) ONLINE SHOPPING WITH VIRTUAL MODELING AND PEER REVIEW

(75) Inventors: Clifton Balter, Neshaminy Valley, PA (US); Brett Finkelstein, Langhorne, PA (US)

(73) Assignee: 4-D Networks, Inc., Langhorne, PA (US)

( * ) Notice: Subject to any disclaimer, the term of this patent is extended or adjusted under 35 U.S.C. 154(b) by 535 days.

(21) Appl. No.: 09/610,678

(22) Filed: Jul. 7, 2000

(51) Int. Cl.[7] .............................................. G06F 17/60
(52) U.S. Cl. .......................... 705/27; 705/26; 345/751; 345/752; 345/753; 345/754; 345/755; 345/756; 345/757; 345/758; 345/759; 434/79; 434/80; 434/395
(58) Field of Search ............. 705/26, 27; 345/751–759; 434/79, 80, 395

(56) References Cited

U.S. PATENT DOCUMENTS

| | | | | |
|---|---|---|---|---|
| 4,539,585 | A | * | 9/1985 | Spackova et al. ............ 382/100 |
| 5,680,528 | A | * | 10/1997 | Korszun ...................... 345/630 |
| 5,724,522 | A | * | 3/1998 | Kagami et al. ............. 395/226 |
| 5,758,327 | A | | 5/1998 | Gardner et al. |
| 5,850,222 | A | * | 12/1998 | Cone ........................... 345/418 |
| 5,893,076 | A | | 4/1999 | Hafner et al. |
| 5,930,769 | A | * | 7/1999 | Rose ............................. 705/27 |
| 6,058,373 | A | | 5/2000 | Blinn et al. |
| 6,295,551 | B1 | * | 9/2001 | Roberts et al. .............. 709/205 |
| 6,307,568 | B1 | * | 10/2001 | Rom ............................ 345/629 |
| 6,310,627 | B1 | * | 10/2001 | Sakaguchi ................... 345/630 |
| 6,317,722 | B1 | * | 11/2001 | Jacobi et al. .................. 705/14 |
| 6,524,107 | B1 | * | 2/2003 | Brown .......................... 434/72 |
| 6,525,747 | B1 | * | 2/2003 | Bezos .......................... 345/751 |
| 2001/0026272 | A1 | * | 10/2001 | Feld et al. .................... 345/419 |
| 2001/0042029 | A1 | * | 11/2001 | Galvez ......................... 705/27 |

FOREIGN PATENT DOCUMENTS

WO    WO97/10573    *  3/1997  ........... G06T/17/20

OTHER PUBLICATIONS

PR Newswire, Lands' End sets gold standard for customer service online with two new collaborative shopping aids, Sept, 15, 1999.*
White Pines website, http://web.archive.org/web/19981203103858/www.wpine.com/solutions/. dated Dec. 3, 1998.*
CUseeMe, http://www.cuseeme.com/software/videochat.htm, dated May 16, 2000.*
Stacy Kravetz, If That's me inthe E–dressing room, Why doesn'n it fit?, New York Times Sep. 20, 2000.*
Business Wire, Taksheke Corp. releases DplV, a 4D Network Operationg System, Nov. 1, 1996.*
CuseeMe Networks, http://www.cuseeme.com/software/websites.ht.
Windows NetMeeting, http://www.microsoft.com/windows/netmeeting/?RLD=52.

* cited by examiner

Primary Examiner—Jeffrey A. Smith
Assistant Examiner—Mark Fadok
(74) Attorney, Agent, or Firm—Blank Rome LLP

(57) ABSTRACT

When a user browses an online retailer's Web site or a mirror site, the user can select an item and model the item online by having a server generate a digital image of the user wearing the item. If the user is still unsure as to whether to buy the item, the user can enter an online chat room in which the online modeling image is displayed to other users. The user can then receive the other users' feedback before deciding whether to buy the item. In a second embodiment, multiple online modeling images are generated to provide the user with a customized catalog, which can be of items for a single merchant or multiple merchants.

18 Claims, 15 Drawing Sheets

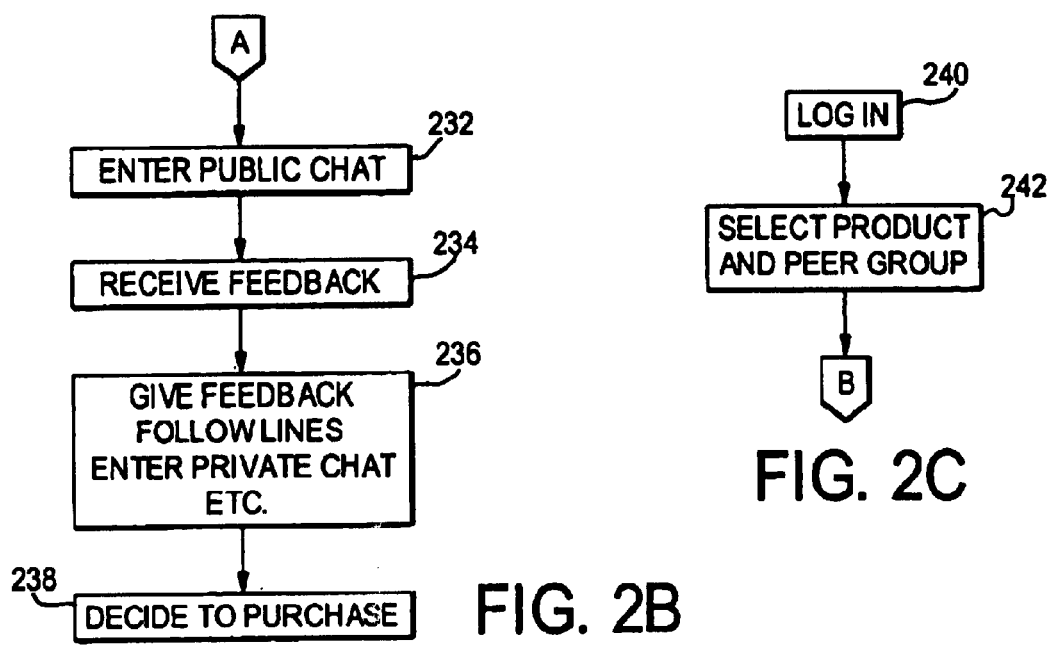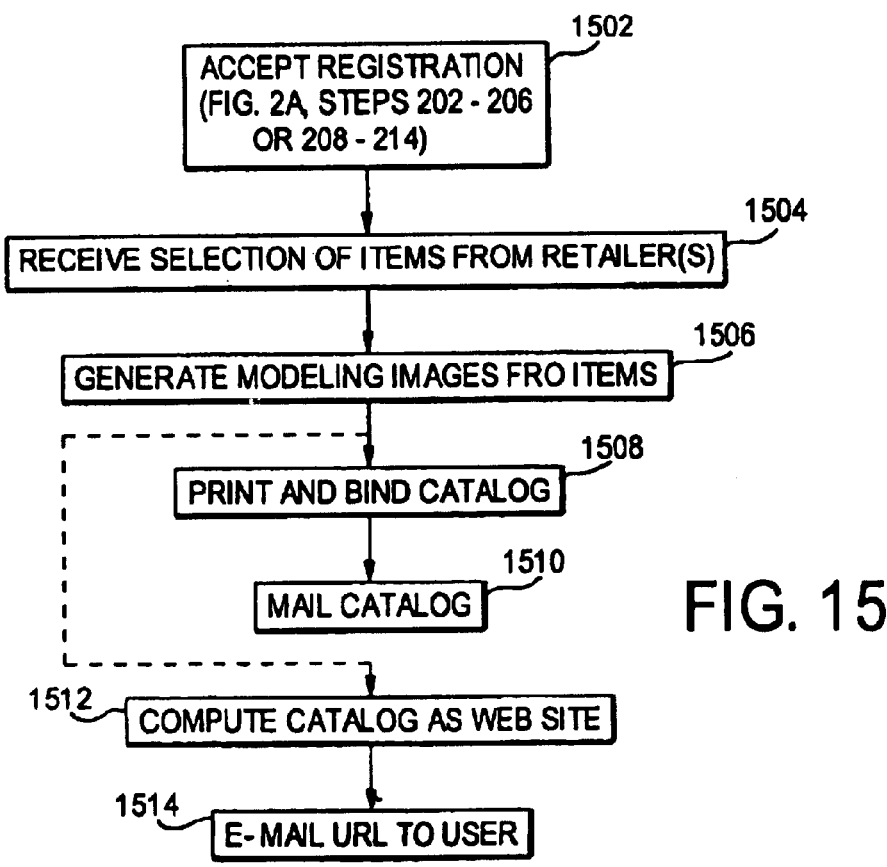

FIG. 4

Become a member!

Pick a member name: _____
Pick a password: _____
Reenter password: _____  ← 402

---

Personal info:  ← 404

Name: _____
Address: _____
City: _____
State: [ Alabama ▽ ]   Zip: _____

---

406 →

To participate, members simply send us a front-facing picture. Head only please, (wallet size will do just fine). Unfortunately, side angels won't allow us to properly size our stylish items to your features.

Welcome bsmith!
PeerThink Network

Who do you prefer to receive an opinion from?

*You may select more than one group*

☐ Generation Y  ■ Generation X  ☐ Baby Boomer  ☐ Bob Hope

What is your geographic location?

*Please make one selection only*

☐ New York     ☐ Seattle   ☐ East Coast
■ Los Angeles  ☐ South     ☐ Mid West
☐ Miami        ☐ North     ☐ South West Describe yourself in 5 words or less

ONLINE SHOPPING WITH VIRTUAL MODELING AND PEER REVIEW

FIELD OF THE INVENTION

The present invention is directed to a system and method for online shopping and more particularly to such a system and method in which a customer can virtually model an item and then receive comments from peers on the virtually modeled item. The present invention has particular, but not exclusive, utility in terms of apparel shopping on the Internet.

DESCRIPTION OF RELATED ART

In recent years, with the popularization of the Internet and particularly of the World Wide Web, online shopping has revolutionized the retail industry. In contrast to brick-and-mortar malls, online shopping can be conducted from the privacy of the customer's home. In contrast to traditional catalog shopping, the buyer does not have to communicate the order to the retailer by mail, facsimile, or telephone; instead, the buyer can simply point and click to order. Also, since a human order taker does not have to read the order form or take the order over the telephone, the order can be fulfilled quickly and accurately.

However, online shopping also has the disadvantage that the buyer cannot physically inspect the item. While that disadvantage is minor for bookstores, it is a major problem for apparel retailers, since customers prefer to try on apparel before buying.

To overcome that disadvantage, various techniques for virtual modeling of apparel, particularly eyewear, have been developed. An illustrative example of such a technique is disclosed in U.S. Pat. No. 5,983,201 to Fay. The online retailer obtains digital images of the customer's head and face to obtain size and image data. Later, the customer can visit the online retailer's Web site from any location, such as the customer's home, to view various kinds of eyeglasses. The online retailer's server generates images of the customer with the eyeglasses resized to fit the customer's head to show how the customer would look in each kind of eyeglasses.

However, Fay and similar techniques ignore a social aspect of apparel shopping. Many customers do not simply wish to see for themselves how they would look in a particular item of apparel; instead, they bring along friends or family members and solicit those friends' or family members' opinions before making a buying decision. Shoppers may also solicit the opinions of store clerks or of complete strangers. It is difficult to do any of those things in front of a computer. Furthermore, trips to brick-and-mortar shopping malls have a social role that online shopping has not yet duplicated.

It is also known in the art to allow potential buyers to exchange information about items over the Internet. Such information exchanges typically take the form of non-real-time message boards such as those on Deja.com, or the reader reviews of Amazon.com. The use of chat rooms to let potential buyers exchange information is taught by U.S. Pat. No. 6,041,311 to Chislenko et al, U.S. Pat. No. 6,049,777 to Sheena et al and U.S. Pat. No. 6,058,379 to Odom et al. However, such information exchanges do not overcome the above-noted problems with Fay and similar techniques.

SUMMARY OF THE INVENTION

It will be apparent from the above that a need exists in the art to allow an online shopper to view potential purchases, such as items of apparel, through online modeling while soliciting the opinions of others. It is therefore a primary object of the invention to permit the display of online modeling images to others.

It is another object of the invention to permit a potential purchaser to receive the comments of those others viewing the images.

It is still another object of the invention to permit those comments to be received in real time.

It is yet another object of the invention to replicate the social experience of a trip to the mall in the context of online shopping.

To achieve the above and other objects, a first preferred embodiment of the present invention is directed to a combination of online modeling with real-time chat. When a customer selects an item, the customer has an image generated of him- or herself wearing the item. Such image generation can be performed in accordance with known techniques. The user can then solicit the opinions of others in a chat room, which can be specific to a certain age group, geographical area or the like. Private chat rooms can also be created. If a customer sees an item which someone else is trying on, the customer can click on a link to purchase that item. The chat can be text chat, audio chat, or a combination of the two.

The public chat rooms can be grouped by various criteria, e.g., geography, age, or personal style (conservative, punk, or the like). The other persons in a public chat room can be professional reviewers, other persons trying on items, or a mix of the two. In the case of another person trying on an item, that person's image can be linked to a location on a retailer Web site to purchase that item. Such a link is useful if, for example, a user sees another user modeling a green shirt and is interested in that green shirt.

The private chat room can also be used to simulate a trip to a brick-and-mortar mall. Two or more persons can agree beforehand to access the site and to create a private chat room, or a user can go through a matching process to select persons already online for the private chat room. The participants in the private chat can still interact with the persons in the public chat room and view any items on display there.

A second preferred embodiment of the present invention generates a catalog containing digital images showing the customer modeling the items for sale through the catalog. Such a catalog can be used for items from one retailer or several retailers and can be provided to the customer online or mailed. With the catalog, the customer does not have to specify any item for online modeling or wait for the image to be generated. The customer can easily show the catalog to friends and family members.

The invention is not limited to apparel sales. Instead, it can be used in any context in which virtual modeling can be used, from new hairstyles to furniture. In the case of furniture, the customer supplies pictures of rooms for the online modeling. Alternatively, the house can be scanned.

The digital images can be acquired in any suitable way. One possibility is to provide kiosks on the premises of participating retailers. Such kiosks can be equipped with digital cameras and other data input devices such as keyboards; a customer can register for the online modeling service, obtain a password and have the digital images taken in a single sitting. Alternatively, the customer can e-mail digital images or send in hard-copy photographs for scanning. In the case of customer-provided digital or hard-copy images, the Web site of the online modeling system can provide instructions regarding acceptable poses or other matters.

The invention allows clothing, apparel, and accessory retailers to offer virtual modeling for customers to view products on their person. The customers can then receive an opinion from another person or persons in a virtual opinion room. Opinion providers can be fellow opinion solicitors who are themselves trying on items, or they can be other members who are shopping via the network. When a new customer signs up, that new customer receives an email address and can then shop via the network for the products of participating retailers. A user can click a desired product in an opinion room and purchase that product within seconds. Opinion rooms can be segregated by product brand, gender, fashion style classification (conservative, hip, classical, etc.), geographical location, user characteristics, personality type, etc. Each solicitor will be able to solicit a professional opinion from the retailer or a personal opinion from friends before soliciting via the opinion room. Rooms can be either "private" or "public" within the network. Customers can solicit an opinion from a specified "provider" either in public or private. The opinion provider can be anonymous or known to the shopper. Public interaction can become private interaction when both persons engage in a private room.

The customer, after reviewing and evaluating opinions received from all persons as well as considering her own opinion, will make a decision to buy the product(s) or not. The customer will either end up with a product(s) that best fits that customer's wants and needs or make an educated purchasing decision against the product(s).

Members will view items that other members are "trying on". They will provide opinions on these items at their leisure. Members will use the network as their way of shopping for fashion items, although the invention can be adapted to any items which can be virtually modeled online. Upon identifying an item of interest on the image of another member, they can then purchase that item from the corresponding retailer. The invention thus allows a match between a product's characteristics with the shopper's wants/needs.

A user can be provided with a book of fabric samples to use in conjunction with the online modeling to evaluate a potential purchase. That fabric book can be given to the user at the time the user registers for the online modeling service. Thus, the user can gain an appreciation of the feel and quality of the fabric in a particular garment during online shopping.

BRIEF DESCRIPTION OF THE DRAWINGS

Preferred embodiments of the present invention will be set forth in detail with respect to the drawings, in which:

FIGS. 2A–2C show flow charts of operations involved in the first preferred embodiment;

FIG. 4 shows a Web page for entering information to become a member;

FIG. 11 shows a Web page in which the user selects the type of person from whom she wishes to receive an opinion;

FIG. 15 shows a flow chart of operations performed in the second preferred embodiment of the invention.

DETAILED DESCRIPTION OF THE PREFERRED EMBODIMENTS

Figure 1:
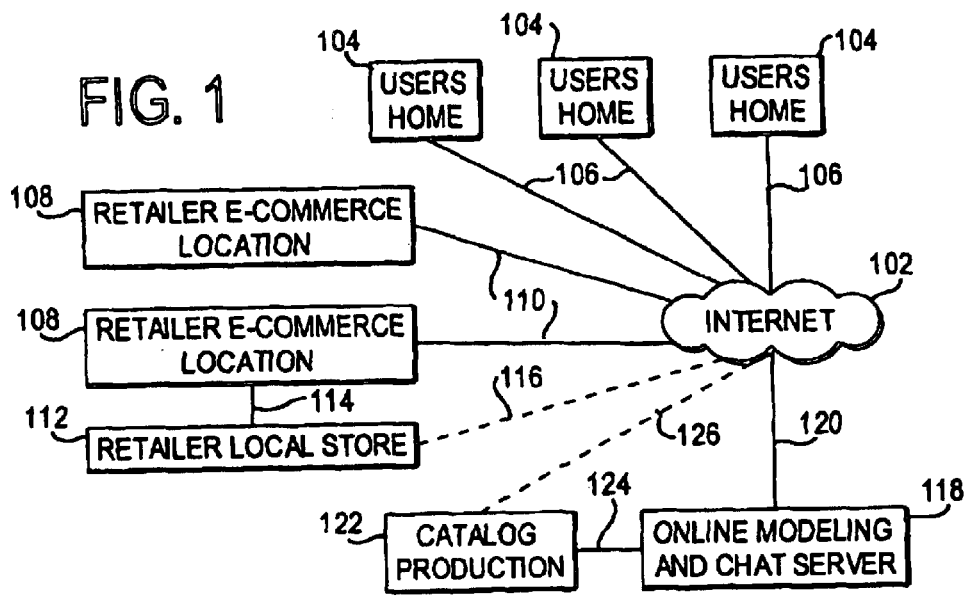
FIG. 1 shows a block diagram of an overview of a system on which the first or second preferred embodiment of the invention can be implemented.

Preferred embodiments of the present invention will now be set forth in detail with reference to the drawings, in which like reference numerals correspond to like elements throughout.

FIG. 1 shows an overview of the various components of a system according to the first preferred embodiment of the present invention. It is contemplated that the various components will communicate over the Internet 102, although any other suitable communication technology, such as leased lines, could be used instead. It is also contemplated that multiple retailers will subscribe to a single service to provide the online modeling and chat, although a retailer could 117 choose to bring either or both of those functions in-house.

Multiple users' homes 104 are connected to the Internet 102 over any suitable connections 106. The types of connections 106 (e.g., dial-up, cable modem, DSL) and the computers running at the users' homes 104 (e.g., IBM-compatible microcomputers or Macintoshes) are well known and will not be described here.

Multiple retailer e-commerce locations 108 are connected to the Internet 102 over full-time connections 110, such as T1, T3 or OC3. Each retailer e-commerce location 108 has a Web server running a suitable operating system (e.g., Linux) and Web server software capable of performing required e-commerce functions such as presentation of an online catalog, SSL for credit-card acceptance, CGI for implementing a shopping cart and a database for maintaining inventory. A retailer e-commerce location 108 can be connected to a retailer local store 112 over either a dedicated link 114 or an Internet connection 116. The retailer local store can then include a kiosk to allow a user to register and have a picture taken in the store. Alternatively, the kiosk can be provided in a corridor in a mall.

An online modeling and chat server 118 is connected to the Internet 102 over a full-time connection 120. The online modeling and chat server 118 provides online modeling services such as those described above with reference to the related art. The server 118 also provides video chat through a technology such as CUseeMe.

The images generated through online modeling can be sent to a catalog production facility 122 over either a dedication connection 124 or an Internet connection 126. The catalog production will be explained below with reference to the second preferred embodiment, which can be combined with the first preferred embodiment.

The retailer locations 108, the server 118 or both can be replaced with mirror sites. For example, a large Internet service provider may contract with a retailer to mirror that retailer's site on the Internet service provider's own servers.

Figure 2A:
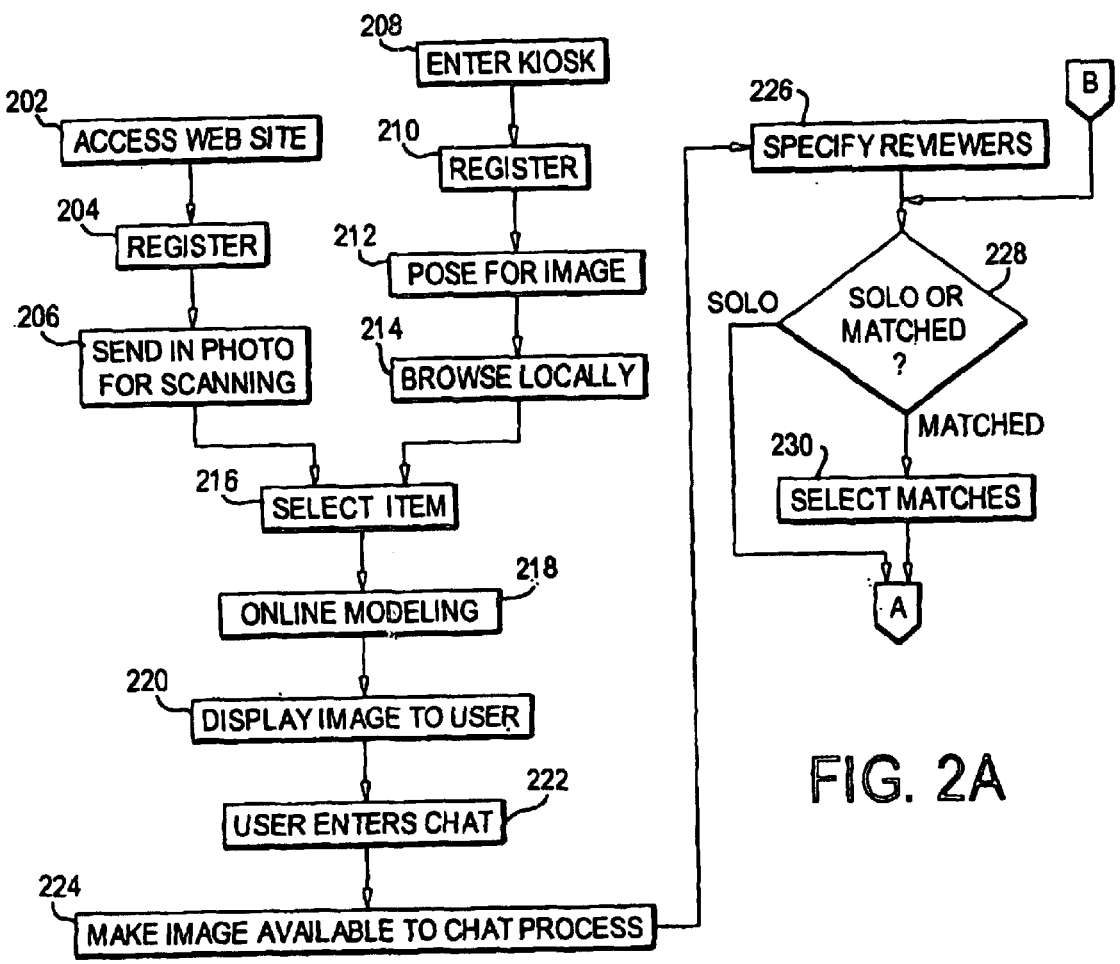

The operation of the system of FIG. 1 will now be explained with reference to the flow charts of FIGS. 2A–2C.

There are two ways to register with the online modeling and chat server 118. The first can be performed from home and starts in step 202 with accessing the Web site of the server 118. That Web site can be accessed directly, by typing its URL into the Web browser. Alternatively, a participating retailer will provide a link to that Web site from its own Web site.

Figure 3:
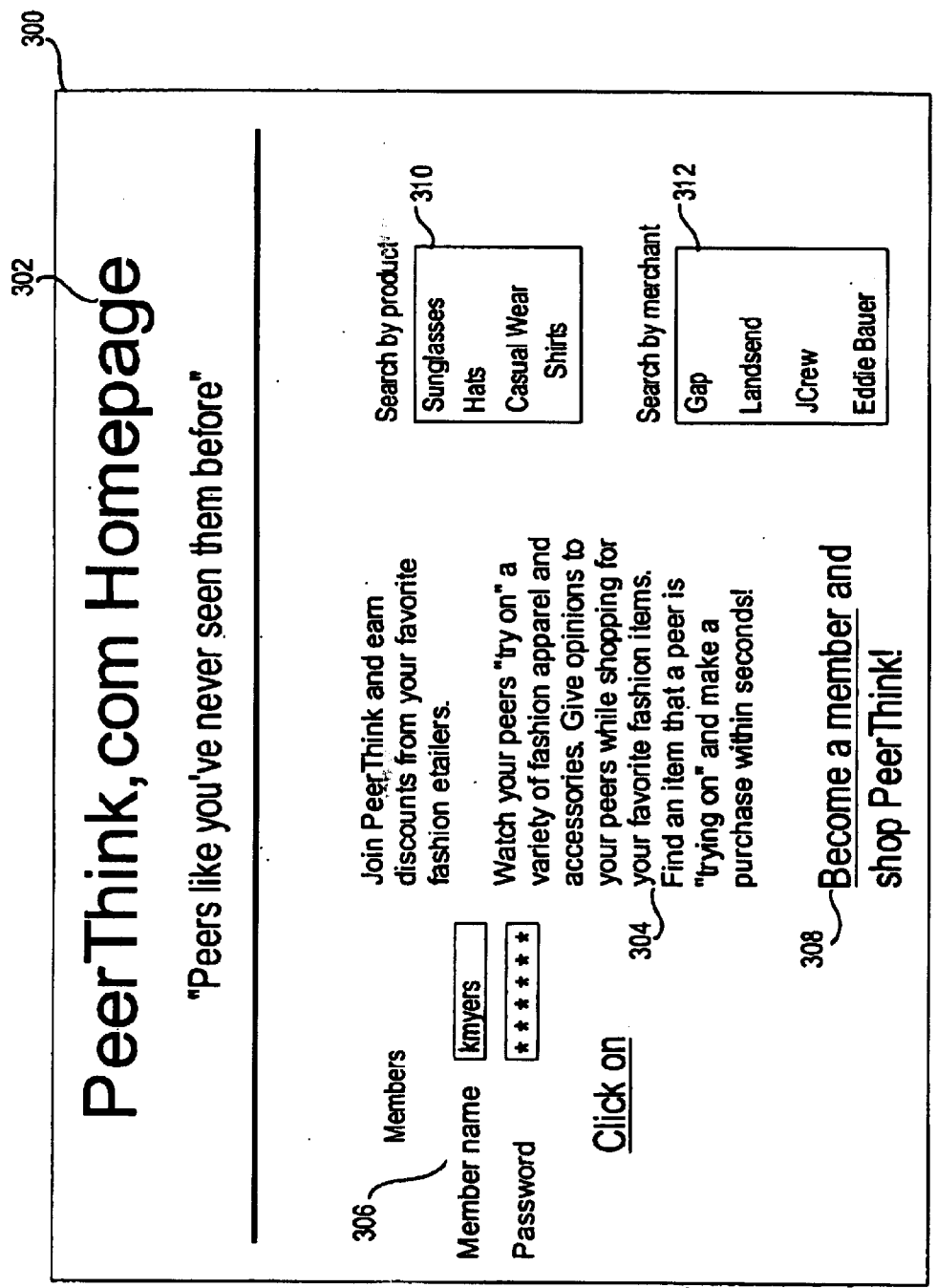
FIG. 3 shows a Web page for logging in or becoming a member.

An example of such a Web site is shown in FIG. 3. The home page 300 shown in FIG. 3 includes a header 302 and explanatory text 304. In addition, existing members can log on using the log-on area 306, while others can become members by following a "Become a member" link 308. The home page 300 also offers the ability to search through participating retailers' offerings through a "Search by product" area 310 or a "Search by merchant" area 312.

Following the "Become a member" link leads to the "Become a member" page 400 shown in FIG. 4. That page 400 includes text boxes and drop-down lists implemented through well known CGI techniques. A member name and password section 402 prompts the user to select a member name and a password. The password is entered twice for verification purposes, as is well known in the art. A personal information section 404 prompts the user for personal and demographic information. A photograph prompting section 406 prompts the user to send in a photograph (FIG. 2A, step 206) and explains what pose is needed for the online modeling. Of course, the specific questions shown in FIG. 4 are illustrative rather than limiting; those skilled in the art will readily appreciate what questions should be included in any given situation.

The user then registers in the usual way in step 204, providing a user name and password as well as personal information. In addition, the user must send in a photograph for scanning in step 206.

The second way involves the kiosk mentioned above. Such a kiosk includes a digital camera, a monitor for displaying prompts to the user and a keyboard or other data input device for receiving the user's registration information. Such kiosks are known in the art and have been proposed or used for purposes as varied as the remote renewal of drivers' licenses and sending e-mail messages with image attachments. The user enters the kiosk in step 208 and registers, in a manner similar to that described above with reference to FIG. 4, in step 210. In step 212, the user poses for the image to be taken by the digital camera; the monitor can provide on-screen prompts for an appropriate pose, similar to those shown in FIG. 4. While the server 118 processes the registration, the user can use the kiosk in step 214 for browsing and online modeling of items available through the store at which the kiosk is located. As an incentive to the user to register, either the store or the operator of the server 118 can provide the user with a gift, such as a microphone headset or a fabric book.

Figure 5:
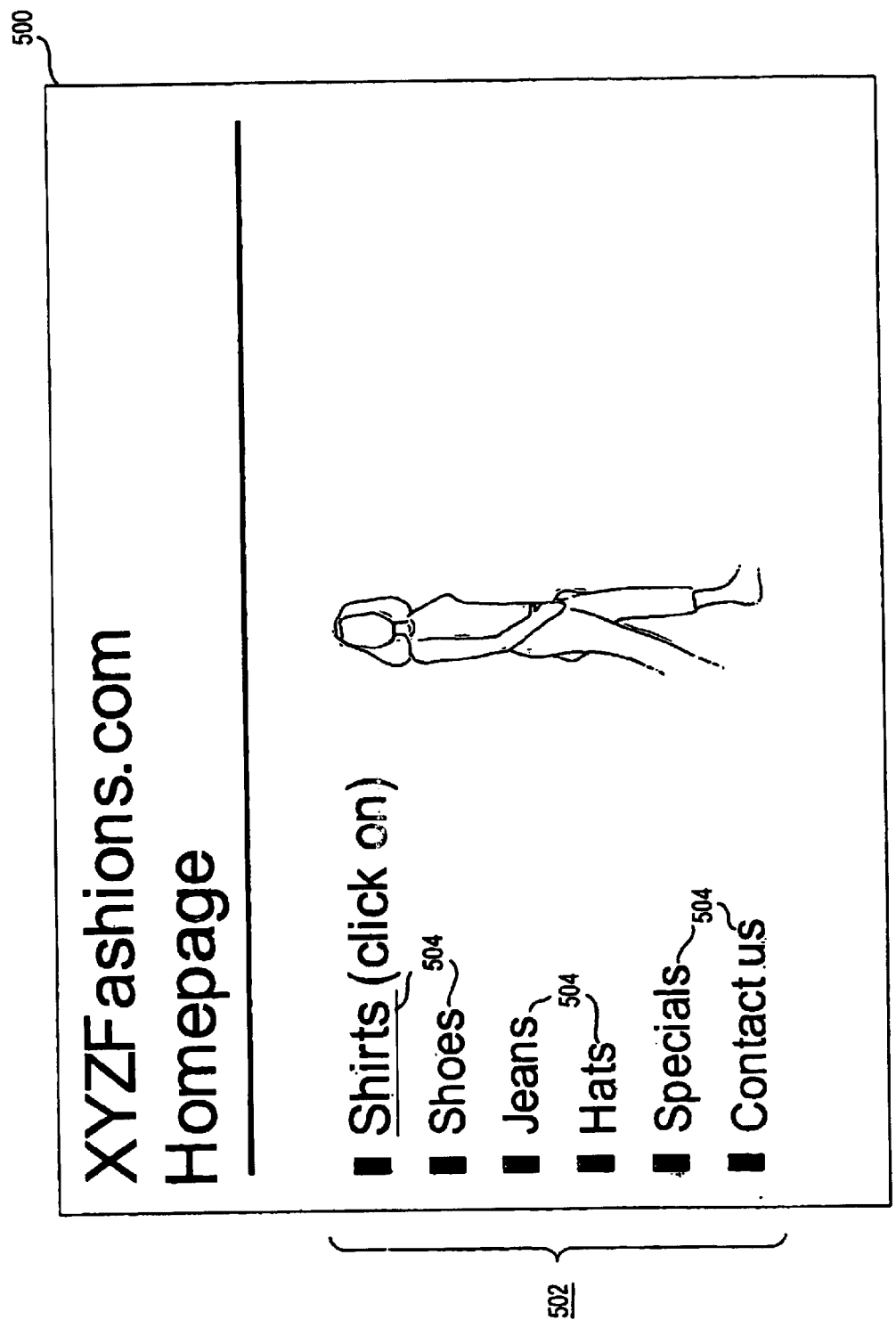
FIG. 5 shows a retailer home page which can be used in conjunction with the present invention.
Figure 6:
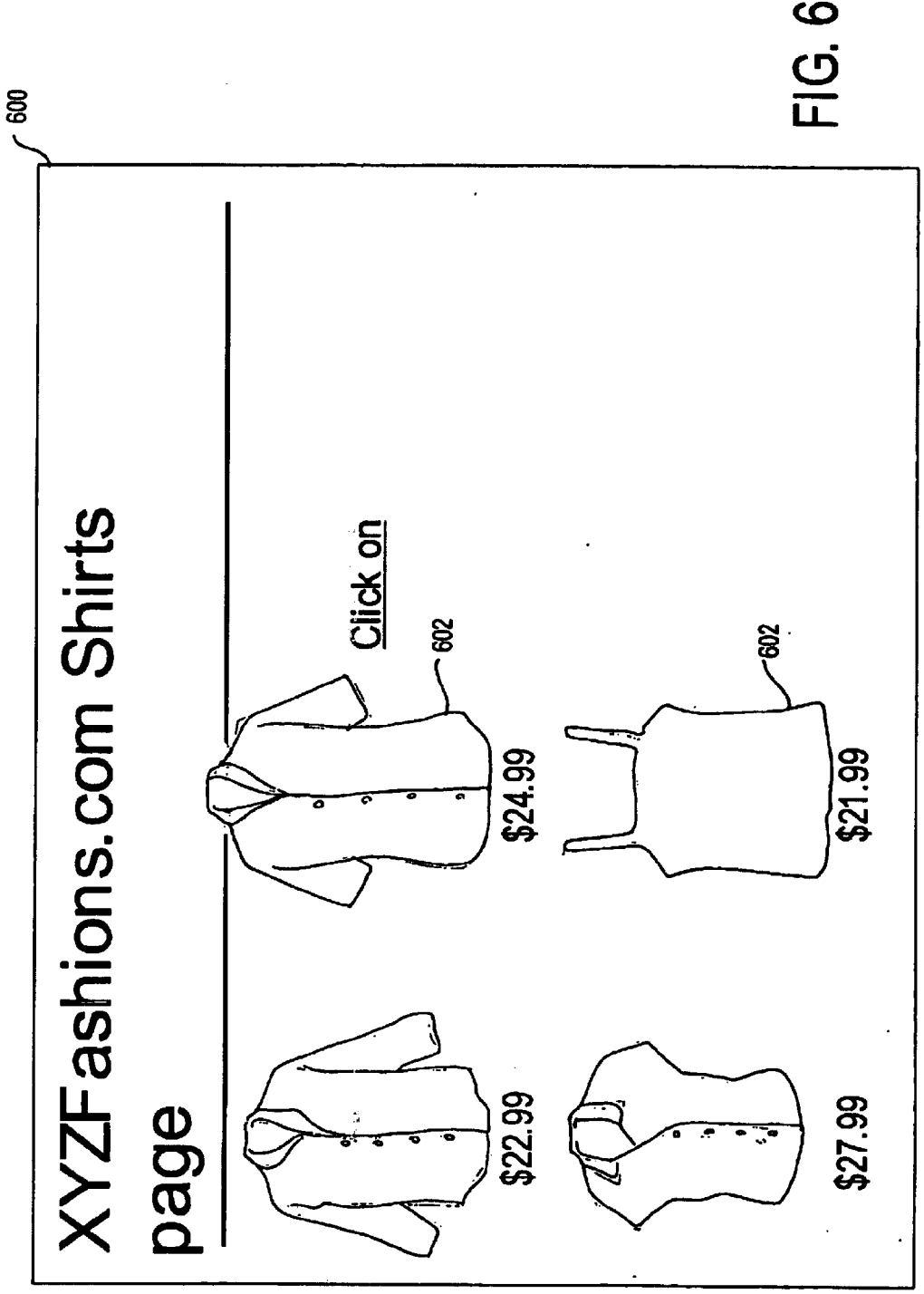
FIG. 6 shows a retailer Web page listing shirts.
Figure 7:
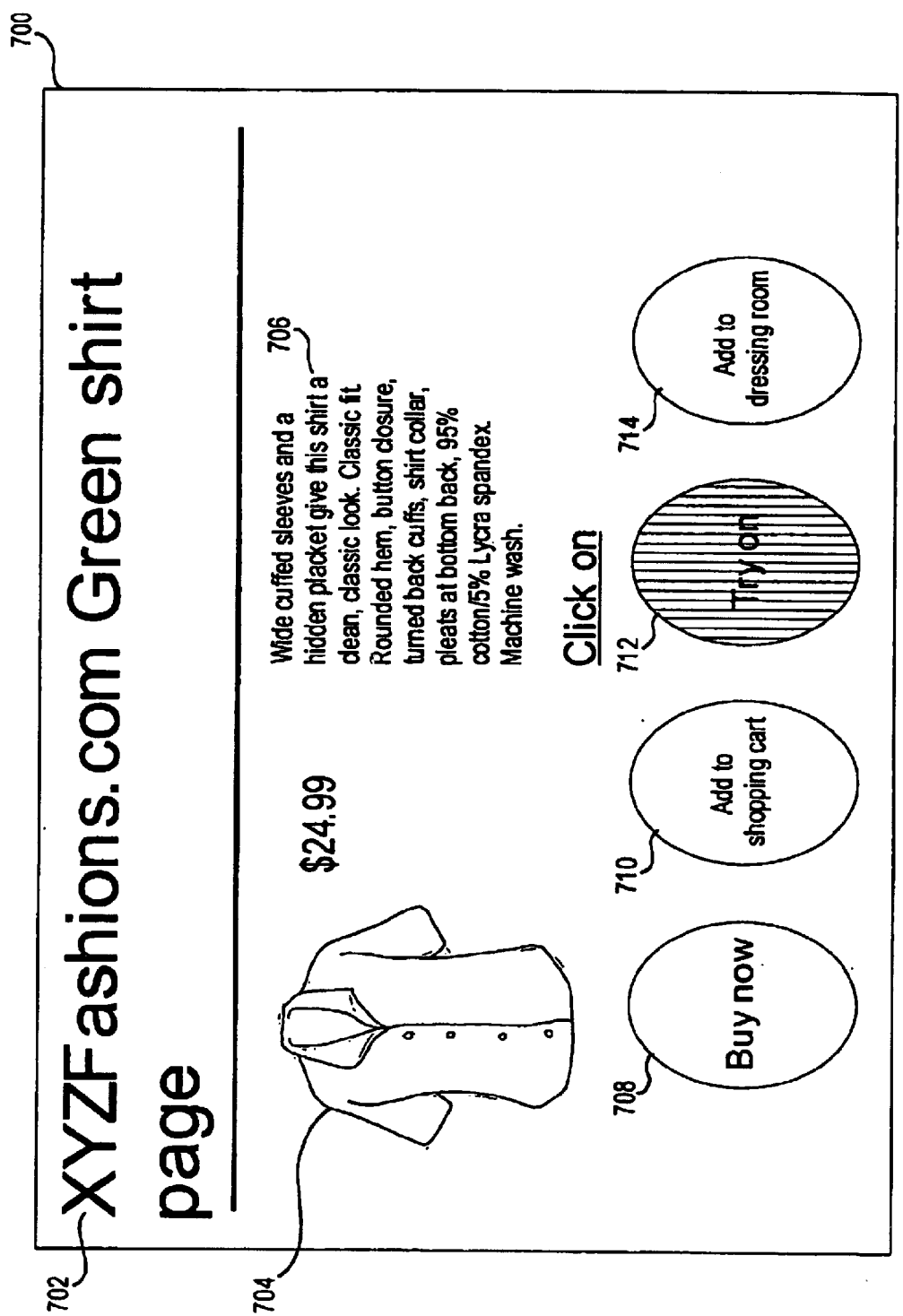
FIG. 7 shows a retailer Web page concerning a specific shirt.

Once the registration procedure of steps 202–206 or 208–214 is completed, the user is ready to proceed to the online modeling. Of course, the user does not have to do so immediately after registering; instead, the user can do so at any time after registering (e.g., months later). In step 216, the user selects an item from a participating retailer's online catalog. For example, the user may go to a retailer's home page such as the home page 500 of FIG. 5. That home page 500 includes an area 502 with links 504 to various options. For example, the user can choose to go to the shirts page 600 of FIG. 6, which has links 602 to various kinds of shirts offered by that retailer. Clicking a link 602 for a specific shirt takes the user to a informational page 700 about that shirt, as shown in FIG. 7. That informational page 700 includes a header 702, a stock image 704 of the shirt, and explanatory text 706. The page 700 also includes a "Buy now" button 708, an "Add to shopping cart" button 710 to add the shirt to a list of purchases, a "Try on" button 712 to initiate the online modeling, and an "Add to dressing room" button 714 to add the shirt to a list of items which may be used in online modeling later.

Figure 8:
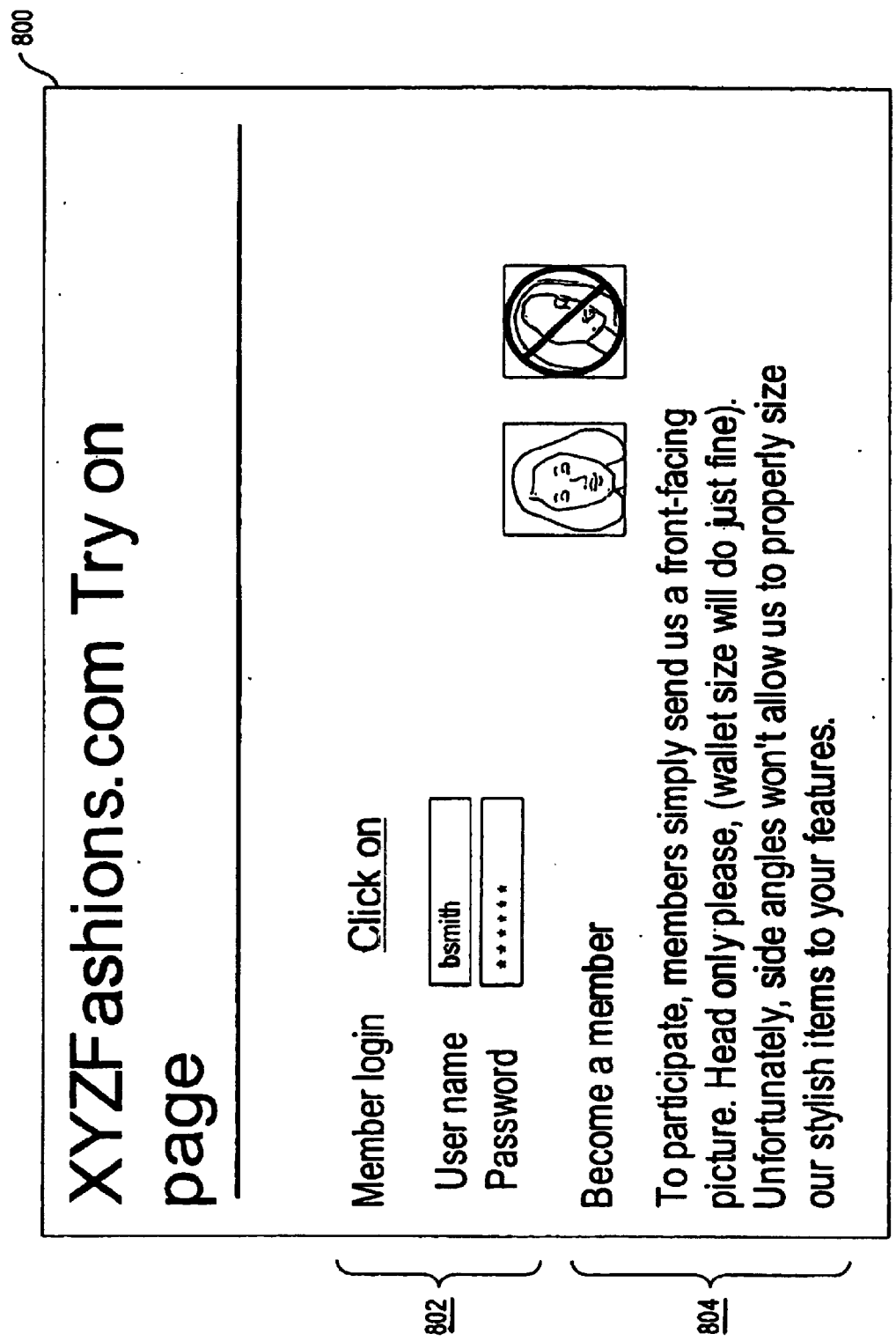
FIG. 8 shows a Web page in which a user logs in to try on the shirt of FIG. 7 through online virtual modeling.

In step 218, the user selects the option for online modeling, e.g., by clicking on the button 712. The page 700 then directs the user to a log-in page 800, shown in FIG. 8. The page 800 includes a member login area 802 and a "Become a member" area 804, the latter of which refers the user to the "Become a member" page 400. Once the user logs in, a cookie can be left on the user's computer to allow the user to skip the log-in procedure the next time.

Figure 9:
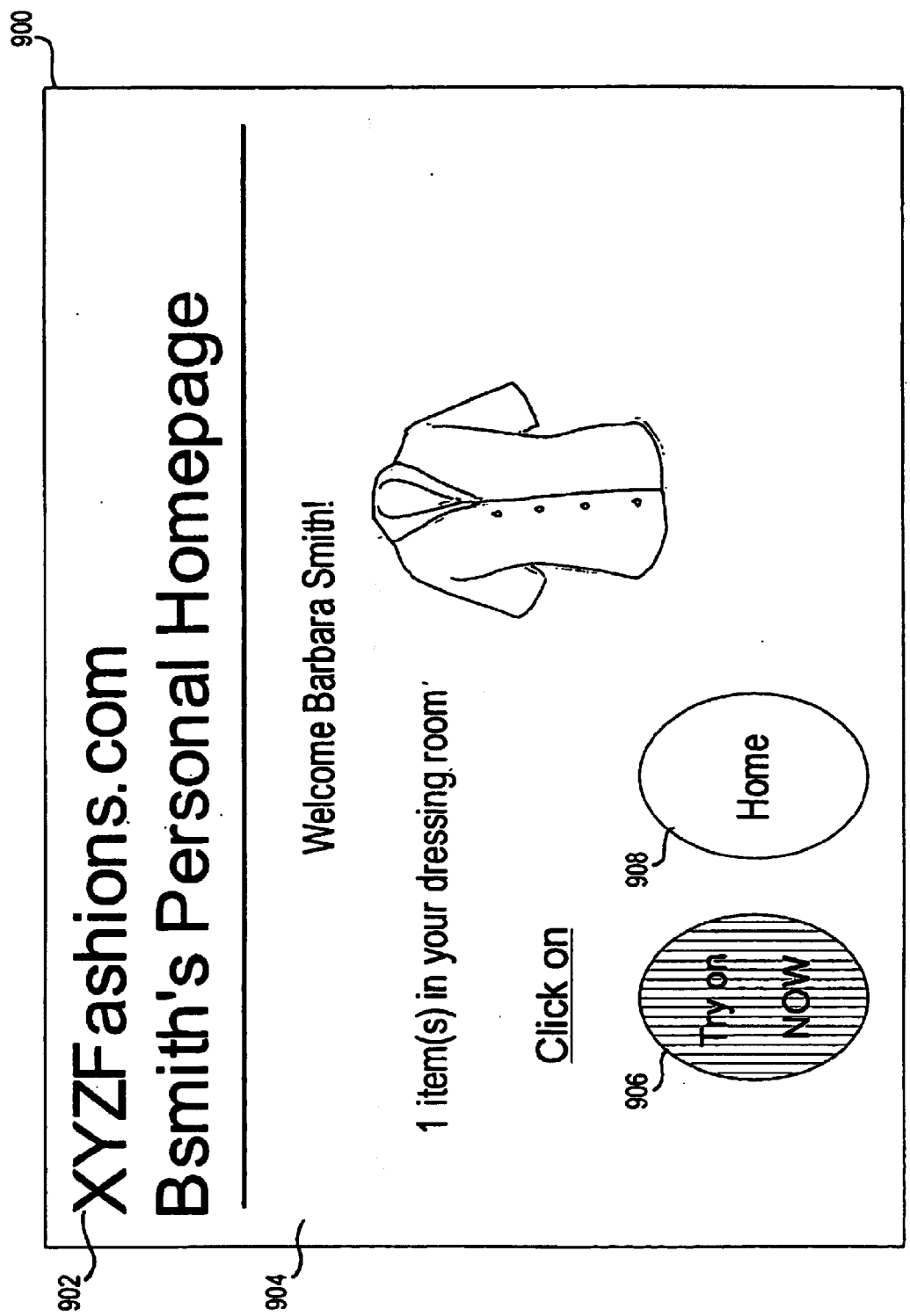
FIG. 9 shows the user's personal home page, which is accessed through the page of FIG. 8.

When the user logs in, the user sees a personal page such as the page 900 of FIG. 9. That personal page 900 includes a header 902 identifying itself by the user's member name, an indication 904 of the number of items in the user's dressing room, a "Try on now" button 906 and a "Home" button 908. To try on an item, the user selects one of the items in the dressing room and then clicks on the button 906.

To return to the home page 500, the user clicks on the "Home" button 908.

Figure 10:
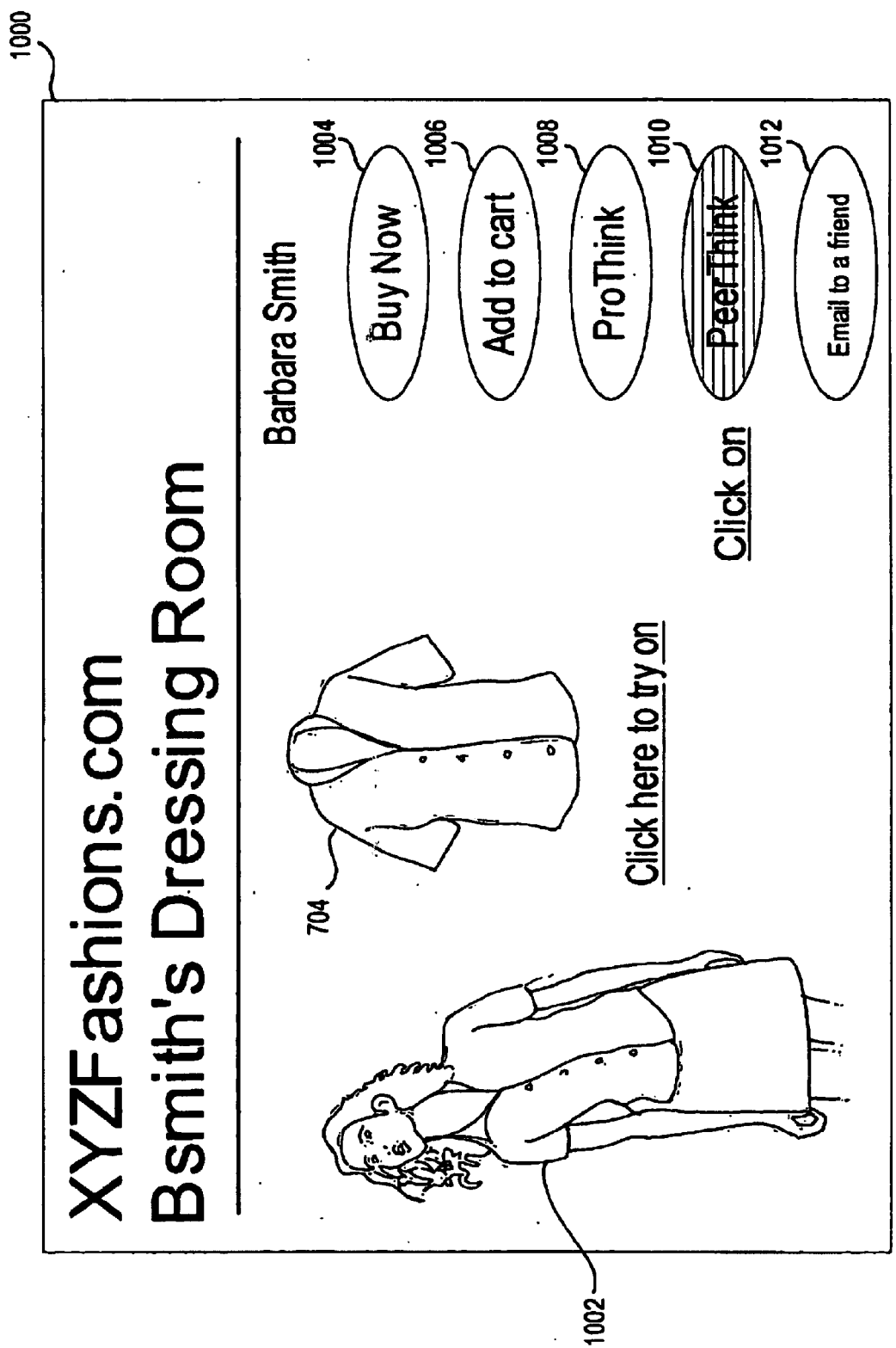
FIG. 10 shows a Web page in which the online virtual modeling page is displayed.

Once the user clicks on the button 906, then in step 220, the server 118, using the image of the user obtained in step 206 or 212, synthesizes an image of the user wearing the item and displays the image to the user in step 220. As shown in FIG. 10, the image is displayed in an online modeling page 1000, which includes the stock image 704 of the shirt and the synthesized image 1002 of the user modeling the shirt. The page 1000 also includes a "Buy Now" button 1004 to buy the shirt now, an "Add to cart" button 1006 to add the shirt to a list of items to be bought, a "ProThink" button 1008 to obtain the opinions of professionals on the shirt, a "PeerThink" button 1010 to obtain the opinions of other shoppers on the shirt and an "Email to a friend" button 1012 to send an e-mail including the image 1002.

The page 1002 can originate on the online modeling and chat server 118, or it can originate on the retailer e-commerce server 108 and include references to images to be obtained form the online modeling and chat server 118. It is well known in the art for a Web page stored on one server to include a reference to an image on another server, such as an outsourced Web counter, simply by including a complete URL, specifying the server name, in the <img src=. . . >.

Sometimes, the user may see the image 1002 displayed in step 220 and decide to buy the item, in which case the user clicks on the button 1004 or 1006 as appropriate. At other times, however, the user may need some more convincing and in particular may want to solicit the opinions of peers, in which case the user clicks on the button 1008 or 1010 as appropriate to enter a real-time chat room in step 222. Of course, the distinction between professional reviewers and other shoppers is illustrative rather than limiting; a single chat room could easily contain both.

The generated image 1002 is then made available to the real-time video chat process in step 224. Techniques to do so are known in the art. For example, drivers are available to allow still images to take the place of video inputs for video application programming interfaces; such a driver could be used with the image 1002.

Once the user chooses to enter a real-time chat room, the user can choose the type of person from whom she wishes to receive an opinion in step 226 through the page 1100 of FIG. 11. The page 1100 includes an area 1102 in which the user can specify one or more age groups, an area 1104 in which the user can specify a geographical area and an area 1106 in which the user can insert a brief description of herself, which will appear by her image in the chat room. The server can determine the user's personal style (e.g., conservative or punk) from the item or items being tried on and can choose reviewers accordingly.

The user can also specify in step 228 whether she wants to enter the public chat room alone (in "solo" mode) or whether she wishes to be matched with others before entering. Should the user wish to be matched, she is shown the matchmaker page 1200 of FIG. 12. The matchmaker page 1200 shows all persons in the selected age group and in the selected geographical area who either are modeling shirts or have indicated an interest in shopping for shirts. The matchmaker page 1200 includes entries 1202 (including one for the user herself) each showing the generated image 1002, the member name 1204, a logo 1206 of the retailer of the item being modeled, a brief description 1208 of the item with a link to the retailer site where that item can be purchased. Each such entry, except that for the user herself, includes the brief description 1210 entered in the area 1106 of the page 1100.

The matchmaker page 1200 further includes entries 1220 for persons who are not trying on any item at the moment. Such persons enter the chat room in a manner to be explained below. Each entry 1220 includes a member name 1204, the logo 1222 of the company providing the online modeling and chat server 118, the still photograph 1224 provided during registration and the brief description 1210. The user uses the matchmaker page 1200 to select matches in step 230.

Figure 12:
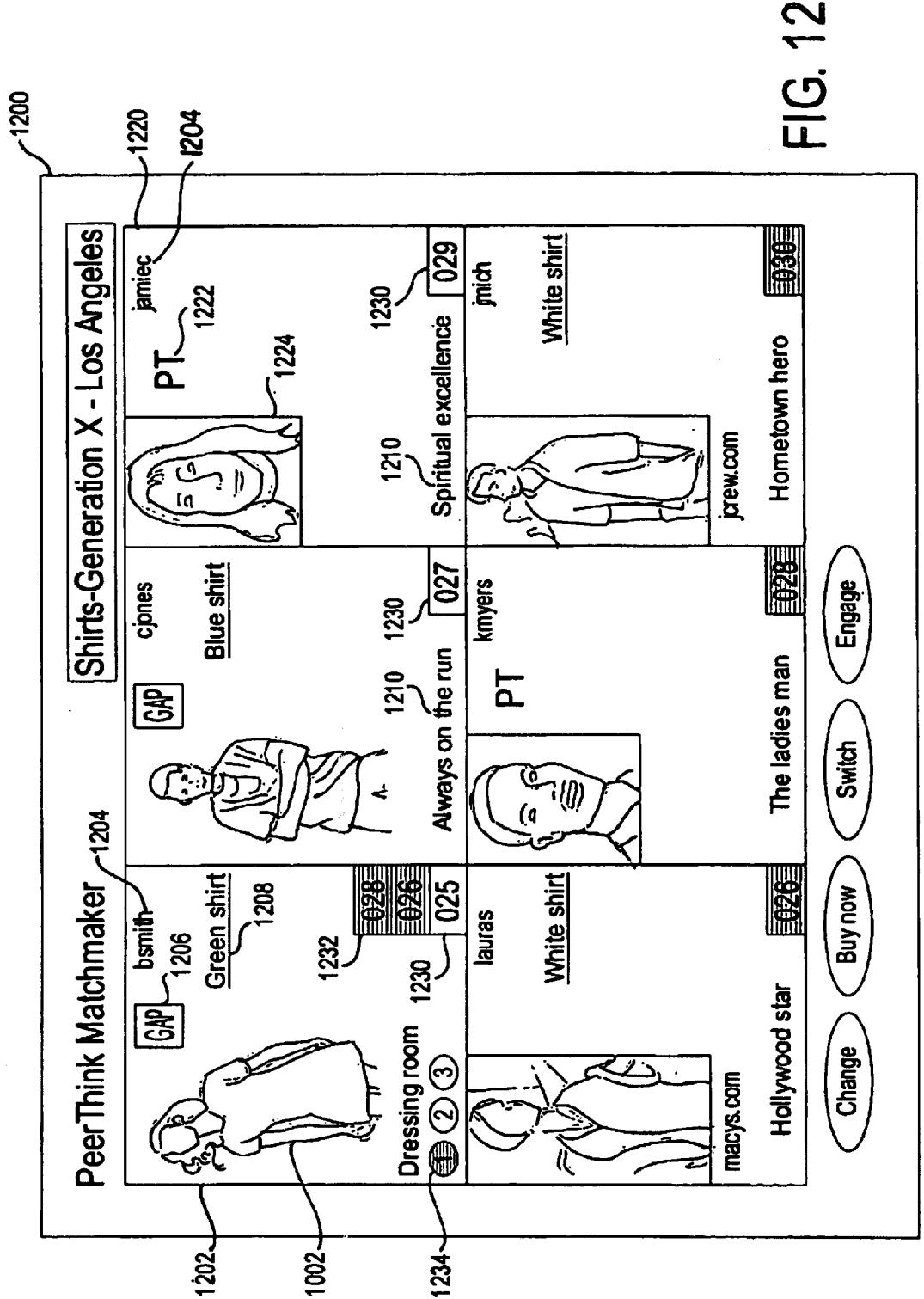
FIG. 12 shows a Web page of potential matches for the user in accordance with the selections made in the page of FIG. 11.

Each entry 1220 also includes a box number 1230 assigned by the server 118 to that user. The box numbers 1230 provide a way for users to identify one another in addition to the member names. For example, if a user knows the box number of another user, the users can communicate with each other via instant messaging, e-mail or the like. As shown in FIG. 12, the user smith has box number 025. The users can contact one another by box number to request permission to form or join private chat rooms. The indicators 1232 show user bsmith (025) that she, lauras (026) and kmyers (028) have jointly decided to enter the same private chat room, as will be explained in further detail below with reference to FIG. 13. Once that joint decision is made and communicated to the server 118, the server 118 uses the box numbers to form the private chat rooms. The box numbers are temporary and change whenever a user logs on.

Figure 16:
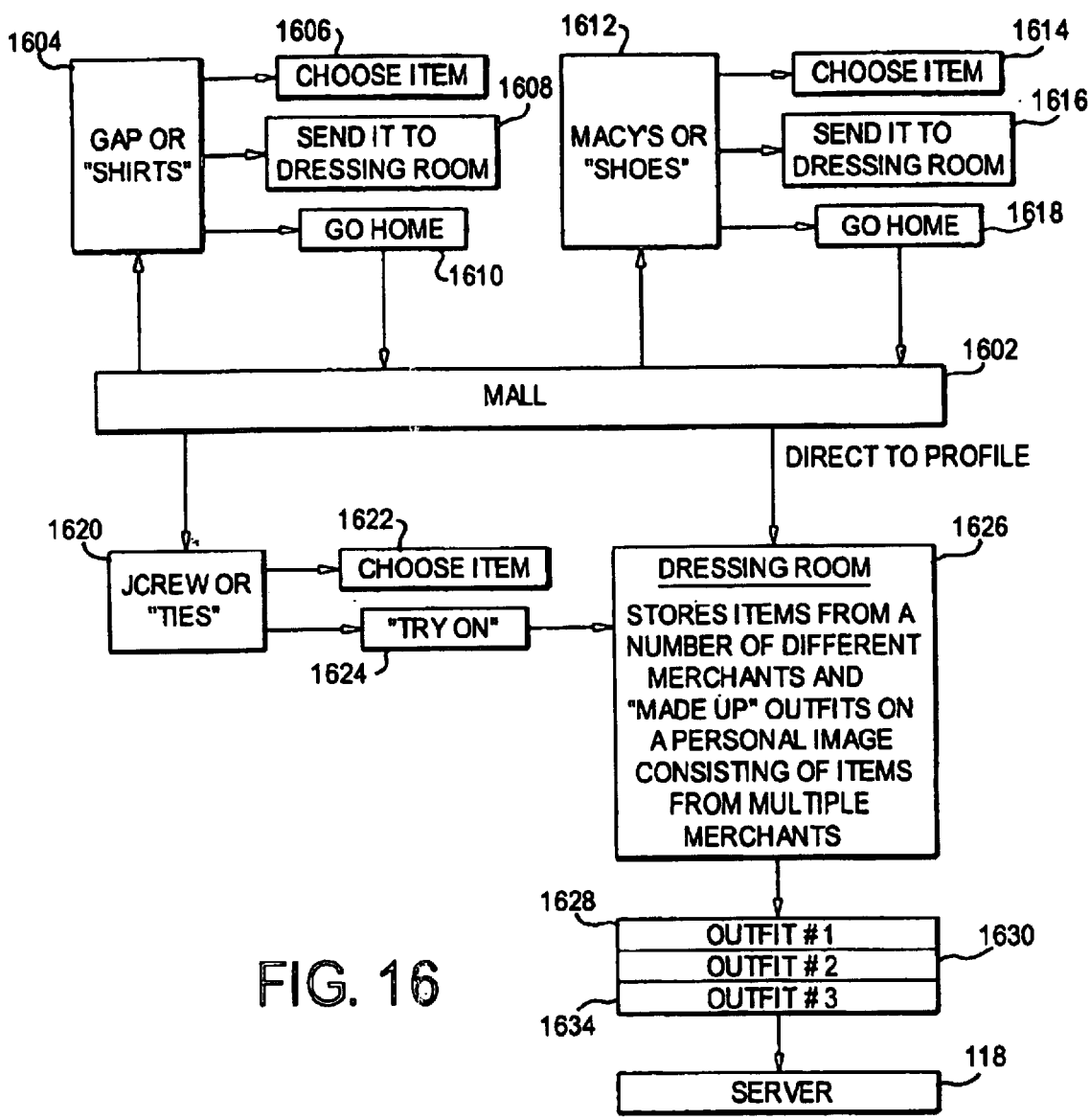
FIG. 16 shows a flow chart of operations performed in assembling and trying on an outfit with items from multiple retailers.

The indicators 1234 show that the user has three outfits in her dressing room and permit her to switch among them. The concepts of outfits and the dressing room will be explained below with reference to FIG. 16.

Figure 13:
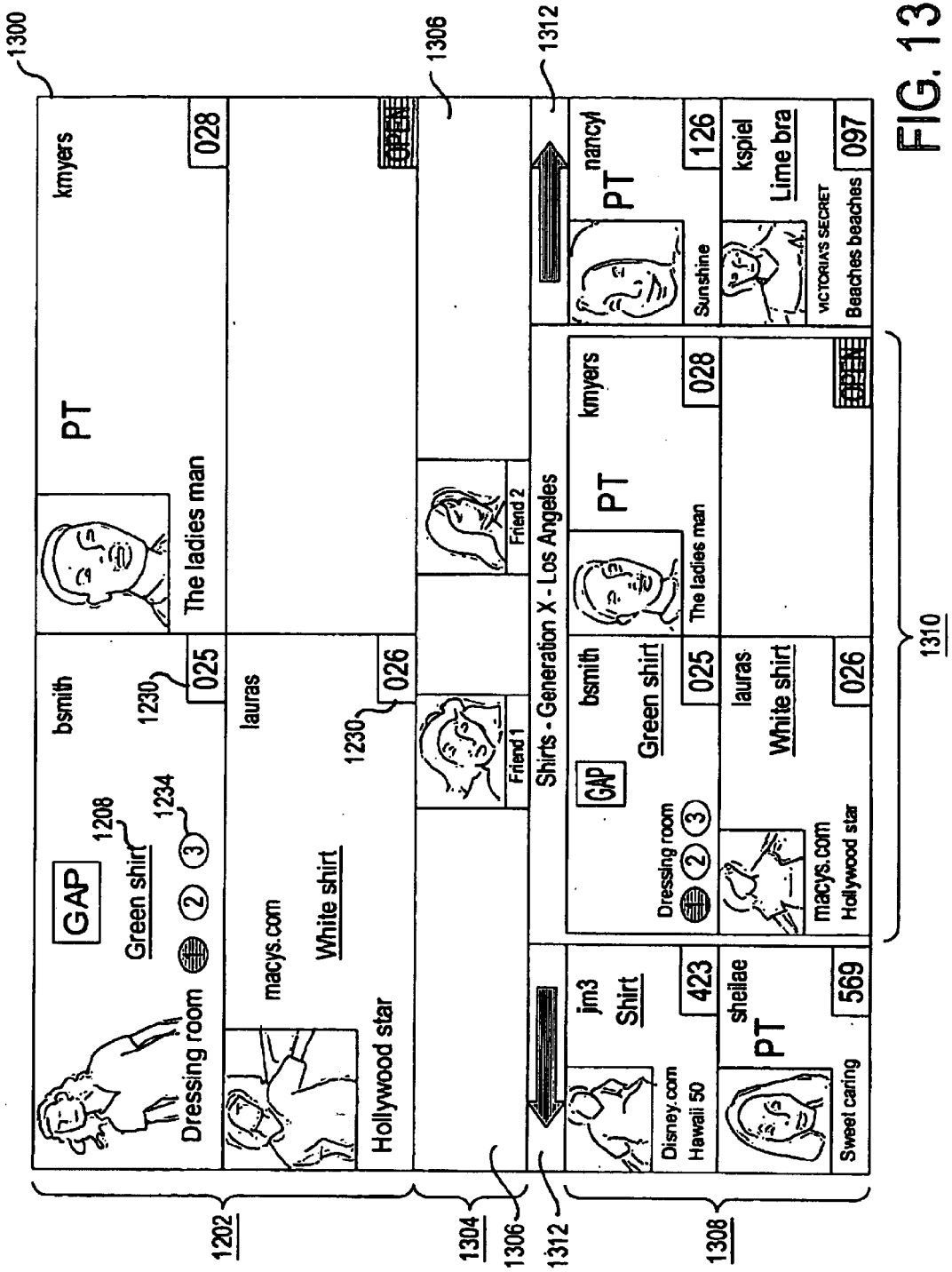
FIG. 13 shows a public chat room.

In step 232, the user enters the public chat area, which appears as the page 1300 of FIG. 13. The chat page 1300 includes an upper area 1302 which shows a private chat room including the user herself and those persons whom she has selected as matches in step 230. In the present example, the user herself is bsmith (025), while the other persons in the private chat room are lauras (026) and kmyers (028). The middle area 1304 includes other shoppers 1306 who are shopping together as friends. The lower area 1308 includes all persons in the age group and geographical area selected by the user. Since those persons in the upper area 1302 are all necessarily in that age group and geographical area, they appear in a subset 1310 of the lower area 1308. Since there will most likely be more persons in the lower area 1308 than can be shown on the screen, scroll buttons 1312 are provided.

Once in the public chat, the user receives feedback in step 234 from anyone who cares to offer it. In step 236, the user can perform any of several actions, such as giving feedback to someone else, following a link to an item that someone else is modeling, or entering a private chat room. In step 238, after having received feedback, the user decides whether to purchase the item.

Opinions can be received in any suitable way, such as by audio, by text in pop-up windows, or by text in a single scrolling window. All of those techniques are known in the art of online chat. In one particular implementation, an instant-messaging technology like that of Mirabilis ICQ or America Online's Instant Messaging can be used, although such instant messaging will be restricted to the users in the chat rooms provided by the server 118.

Figure 14:
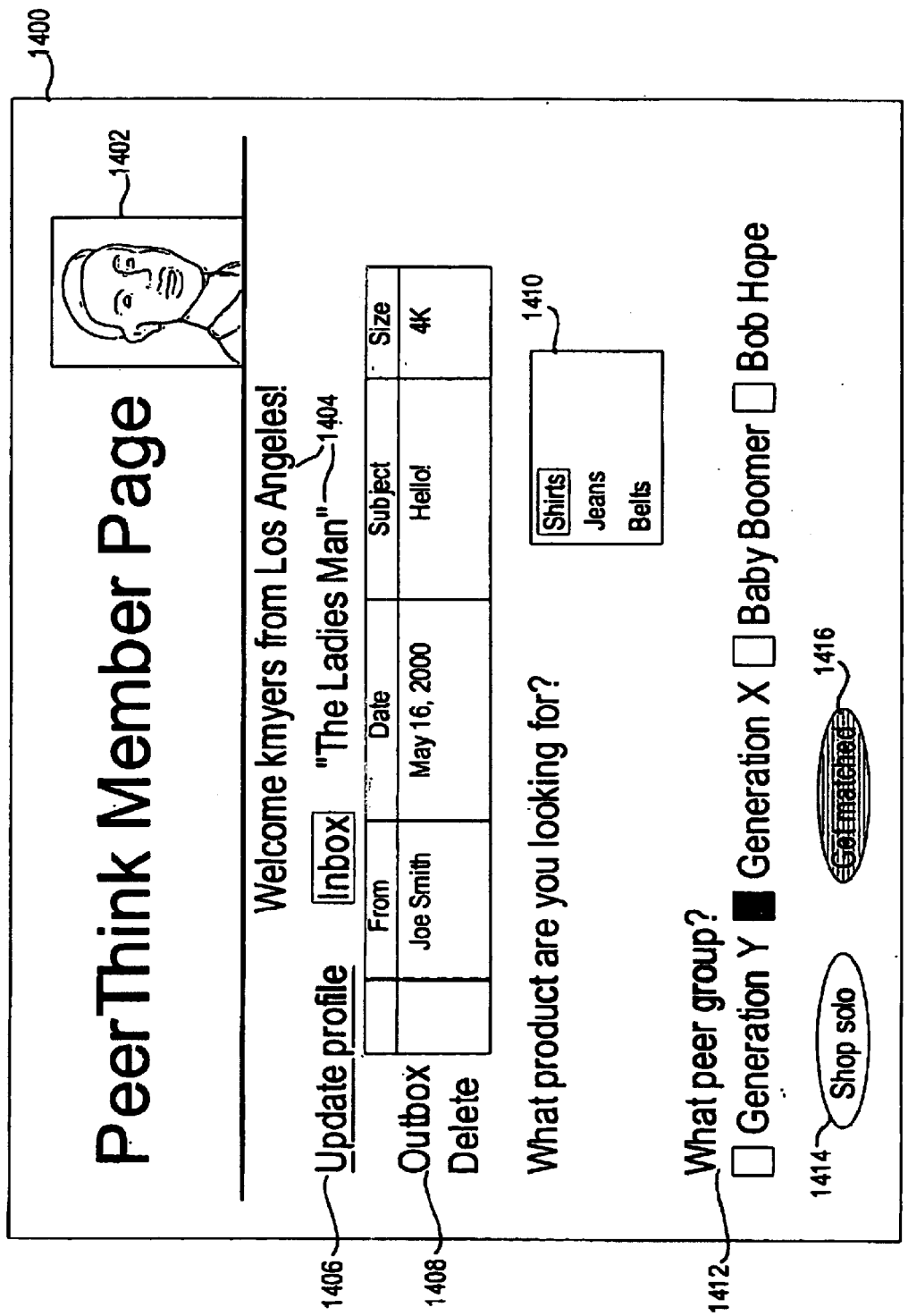
FIG. 14 shows a Web page used to access the public chat room for a user who is not trying on anything at the time.

The process for a user who is not modeling anything at the time will now be described. Such a user must still register as in FIG. 2A, steps 202–206 or 208–214. In FIG. 2C, step 240, the user has the option of logging in through the area 306 of the page 300 of FIG. 3, thus bypassing any retailer Web site. The user then sees a welcoming page such as the page 1400 of FIG. 14. That page 1400 includes the still photograph 1402 previously supplied by the user in step 206 or 212, plus a welcoming message 1404 including the member name, geographical location and brief description as previously entered. The user can update his profile through the link 1406 or check any e-mail sent to his account in the inbox area 1408. He can indicate the product for which he is looking in the product list 1410, specify a peer group in the area 1412 and choose whether he wants to shop solo or get matched by clicking on the button 1414 or 1416. Once he has selected a product and a peer group, as in step 242, the process proceeds to FIG. 2A, step 228.

A second preferred embodiment will now be described with reference to FIGS. 1 and 15. As already indicated, the first and second preferred embodiments can be combined in one working system or deployed separately.

In step 1502, the online modeling and chat server 118 accepts the user's registration as already described above with reference to FIG. 2A, steps 202–206 or 208–214. In step 1504, the server 118 receives a selection of items to be included in the catalog from a retailer or retailers, as the catalog can be produced for a single retailer or as a cooperative venture. In step 1506, the server 118 generates modeling images for the user and for all of the items to illustrate how the user would appear in each of the items. For a hard-copy catalog, the modeling images are sent to the catalog production facility 122, which prints and binds a catalog in step 1508 and mails it to the user in step 1510. For an online catalog, the catalog production facility 122 compiles the catalog as a Web site in step 1512 and e-mails to the user a URL for the catalog in step 1514.

As noted above, either of the preferred embodiments, or a system implementing both preferred embodiments, can be used with multiple retailers. A user can try on a garment from a single retailer at a time or can try on garments from several retailers at once. An example of the latter will be explained with reference to FIG. 16.

The server 118, by serving multiple retailers, serves as a virtual mall 1602. A user, having logged onto the server 118 in any of the ways described above, can search the virtual mall 1602 by retailer or by item of apparel.

In step 1604, the user can search by a first retailer (such as the Gap), or by a first type of item (such as shirts). Having found an item of interest, the user can choose the item in step 1606, send an item to the dressing room in step 1608 and return to the mall in step 1610. The user can then search by a second retailer (such as Macy's) or by a second type of item (such as shoes) in step 1612 and then choose an item in step 1614, send it to the dressing room in step 1616 and return to the mall in step 1618. The user can then search by a third retailer (such as J. Crew) or by a third type of item (such as ties) in step 1620, choose an item in step 1622 and choose to try on the resulting outfit in step 1624.

From the try-on step 1624, or directly from the mall 1602, the user can proceed to the dressing room 1626. The dressing room can be used to store items from several merchants and can be used to make up outfits from such items. Users are encouraged to use the dressing room 1626 to store outfits, such as outfit #1 1628, outfit #2 1630 and outfit #3 1632. Referring back to FIG. 12, the indicators 1234 show user bsmith that she has three outfits in her dressing room. The user selects an outfit to send to the server 118 to produce an online modeling image, which can then be taken to the chat room. Physical storage for the dressing room can be accommodated on a hard drive on the server 118.

In both of the preferred embodiments, as well as in other embodiments which can be realized within the scope of the invention, existing technologies for both online modeling and real-time chat can be used. Examples of online modeling are given in the Fay patent cited above and in the patents cited therein. Examples of real-time video chat are CUseeMe, a product of CUseeMe Networks of Nashua, N.H., and Microsoft Netmeeting, a product of Microsoft Corporation, Redmond, Wash.

While two preferred embodiments of the present invention have been set forth in detail, those skilled in the art who have reviewed the present disclosure will readily appreciate that other embodiments can be realized within the scope of the invention. For example, while the two preferred embodiments have been disclosed with respect to apparel, they can also be used for anything from hairstyles to furniture. In the case of furniture, the user submits a photograph of the room or rooms in which the furniture will be placed or uses a scanner or other device to image the house. Therefore, the present invention should be construed as limited only by the appended claims.

We claim:

1. A method for allowing a user to preview an item from one of a plurality of retailers and solicit opinions on the item before purchasing the item, the method comprising:

(a) storing a first digital image of a setting in which the item is to be used;

(b) receiving from the user an identification of the item, the item being available from a first one of the plurality of retailers;

(c) automatically generating, from the first digital image, a second digital image of the item in the setting in which the item is to be used;

(d) displaying to the user the second digital image;

(e) providing an electronic chat room for the plurality of retailers, the chat room being accessible to the user;

(f) displaying the second digital image to other users in the chat room;

(g) performing steps (a)–(c) for a second user and a second item from a second one of the plurality of retailers to generate a third digital image;

(h) displaying the third digital image in the chat room;

(i) receiving from the user, through a link associated with the third digital image, an indication that the user is interested in the second item shown in the third digital image; and (j) generating, from the first digital image, a fourth digital image showing the item and the second item in the setting in which the item is to be used.

2. The method of claim 1, wherein:

the item is an item of apparel; and the digital image stored in step (a) is a digital image of the user.

3. The method of claim 1, wherein step (f) comprises allowing the user to select a characteristic of the other users in the chat room to whom the second digital image is displayed.

4. The method of claim 3, wherein the characteristic comprises at least one characteristic selected from the group consisting of an age group and a geographical area.

5. The method of claim 1, wherein step (b) comprises:

providing a link from a site of the first one of the plurality of retailers; and receiving the identification of the item when the user clicks on the link.

6. The method of claim 5, wherein at least one of steps (c) and (f) is performed on a server remote from the site of the first one of the plurality of retailers.

7. The method of claim 1, further comprising (k) storing the indication of at least the item and the second item for future use by the user.

8. The method of claim 1, wherein step (a) is performed as part of a registration process in which the user provides personal information in order to access the chat room.

9. The method of claim 1, wherein steps (d) and (f) are performed using the Internet.

10. The method of claim 1, wherein step (f) comprises permitting the user to receive comments from the other users in the electronic chat room regarding the second digital image.

11. The method of claim 1, wherein step (f) further comprises permitting the user and the plurality of other users to exchange comments in the electronic chat room regarding the second digital images.

12. A system for allowing a user to preview an item from one of a plurality of retailers and solicit opinions on the item before purchasing the item, the system comprising:

(a) a server for (i) storing a first digital image of a setting in which the item is to be used, (ii) receiving from the user an identification of the item, the item being available from a first one of the plurality of retailers, (iii) automatically generating, from the first digital image, a second digital image of the item in the setting in which the item is to be used, (iv) displaying to the user the second digital image, (v) providing an electronic chat room for the plurality of retailers, the electronic chat room being accessible to the user, in which the second digital image is displayed to other users, (vi) performing operational steps (i)–(iii) for a second item from a second one of the plurality of retailers to generate a third digital image, (vii) displaying the third digital image in the chat room, (viii) receiving from the user, through a link associated with the third digital image, an indication that the user is interested in the second item shown in the third digital image, and (ix) generating, from the first digital image, a fourth-digital image showing the item and the second item in the setting in which the item is to be used; and (b) an electronic connection for providing communication between the server and a computing device operated by the user at a location remote from the server.

13. The system of claim 12, wherein the server allows the user to select a characteristic of the other users in the chat room to whom the second digital image is displayed.

14. The system of claim 12, wherein the characteristic comprises at least one characteristic selected from the group consisting of an age group and a geographical area.

15. The system of claim 12, wherein the server is remote from a site of the first one of the retailers.

16. The system of claim 12, wherein the server stores the first digital image as part of a registration process in which the user provides personal information in order to access the chat room.

17. The system of claim 12, wherein the electronic connection is an Internet connection.

18. The system of claim 12, wherein the server stores the indication of the item and the second item for future use by the user.

\* \* \* \* \*